(12) United States Patent
Kimura et al.

(10) Patent No.: US 10,306,734 B2
(45) Date of Patent: May 28, 2019

(54) WORKING MACHINE HAVING LIGHTS BEING CONTROLLED BASED UPON DETECTED EXTERNAL ENVIRONMENT

(71) Applicant: HONDA MOTOR CO., LTD., Tokyo (JP)

(72) Inventors: Yuta Kimura, Wako (JP); Yoshimasa Teruya, Wako (JP); Jun Fukano, Wako (JP); Tsutomu Mizoroke, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/033,900

(22) Filed: Jul. 12, 2018

(65) Prior Publication Data

US 2019/0037666 A1    Jan. 31, 2019

(30) Foreign Application Priority Data

Jul. 31, 2017   (JP) .................................. 2017-148282

(51) Int. Cl.
*F21V 33/00* (2006.01)
*H05B 37/02* (2006.01)
*E01H 5/09* (2006.01)
*E01H 5/04* (2006.01)

(52) U.S. Cl.
CPC ........... *H05B 37/0218* (2013.01); *E01H 5/04* (2013.01); *E01H 5/098* (2013.01); *H05B 37/0227* (2013.01); *B60Q 2300/314* (2013.01); *B60Q 2300/324* (2013.01); *B60Q 2300/45* (2013.01); *F21V 33/00* (2013.01)

(58) Field of Classification Search
CPC ....................................................... F21V 33/00

USPC ............................................ 362/89, 460, 464
See application file for complete search history.

(56) References Cited

U.S. PATENT DOCUMENTS

| 5,325,650 A * | 7/1994 | Fuse ................. A01D 43/0631 |
| | | 56/10.2 R |
| 2012/0032594 A1 | 2/2012 | Hagner |
| 2016/0116587 A1 | 4/2016 | Miller et al. |
| 2018/0024563 A1* | 1/2018 | Matsuzaki ........ G01C 21/3697 |
| | | 701/41 |

FOREIGN PATENT DOCUMENTS

| EP | 1862823 A1 | 12/2007 |
| EP | 3088250 A2 | 11/2016 |
| JP | 2001-347884 | 12/2001 |
| JP | 2013-052786 | 3/2013 |
| JP | 2014-070366 | 4/2014 |
| JP | 2016-094093 | 5/2016 |

OTHER PUBLICATIONS

European Search Report dated Dec. 4, 2018, 7 pages.

* cited by examiner

*Primary Examiner* — Thuy V Tran
(74) *Attorney, Agent, or Firm* — Rankin, Hill & Clark LLP (57) ABSTRACT

Presence of a working machine is noticed by those in the surroundings, and a worker is easily informed of a warning relating to an external environment. A working machine includes a detection unit including a sensor detecting an external environment of a machine body, and a control unit that controls a headlight that functions as an illumination unit based on the detected external environment.

7 Claims, 10 Drawing Sheets

FIG. 5A  LIGHTING (NIGHTTIME WARNING)

FIG. 5B  FIRST FLASHING PATTERN (INCLINATION WARNING)

FIG. 5C  SECOND FLASHING PATTERN (OVERLOAD WARNING OF TRAVEL SYSTEM)

FIG. 5D  THIRD FLASHING PATTERN (OVERLOAD WARNING OF WORKING SYSTEM)

FIG. 5E  FOURTH FLASHING PATTERN (DAYTIME WARNING)

WORKING MACHINE HAVING LIGHTS BEING CONTROLLED BASED UPON DETECTED EXTERNAL ENVIRONMENT

INCORPORATION BY REFERENCE

The present application claims priority under 35 U.S.C. § 119 to Japanese Patent Application No. 2017-148282 filed on Jul. 31, 2017. The content of the application is incorporated herein by reference in its entirety.

BACKGROUND OF THE INVENTION

Field of the Invention

The present invention relates to a working machine including an illumination unit that emits illuminating light outward, in a machine body.

Description of the Related Art

In working machines, there are snowplows including headlights that illuminate an area ahead (refer to Patent Literature 1, for example). This kind of headlight of a snowplow is configured to light constantly, or to be turned on and off manually. When the headlight is constantly lit, it becomes easier to inform those in the surroundings of the presence of the working machine, as compared with the case where it is not lit. Further, some snowplows of this kind include a function of informing a worker (an operator) of a warning by an auger lock display light, or a warning light such as an overload warning lamp of a generator, and informing a worker of a warning by a warning sound.

Patent Literature 1: Japanese Patent Laid-Open No. 2014-70366

SUMMARY OF THE INVENTION

However, even if a headlight is lit in the daytime, the change in appearance is small, and those in the surroundings may not notice the presence of the working machine. Especially in noisy environments, or when the working machine is traveling quietly, the working machine cannot be recognized with the sound emitted from the working machine, and it is hard for those in the surroundings to notice the presence of the working machine.

Therefore, an object of the present invention is to cause those in the surroundings to notice the presence of a working machine, and make it easy to inform a worker of a warning relating to an external environment.

In order to achieve the above described object, an aspect of the present invention provides a working machine including, in a machine body, an illumination unit that emits illuminating light outward, including a detection unit that detects an external environment of the machine body, and a control unit that controls the illumination unit based on the external environment. According to the configuration, by using the illumination unit, the presence of the working machine is noticed by those in the surroundings in accordance with an external environment, and a worker or the like can be easily informed of a warning relating to the external environment.

In the above described configuration, the detection unit detects a plurality of kinds of external environments, and the control unit determines a lighting state associated with a detected external environment from lighting states that individually report the plurality of kinds of external environments, and controls the illumination unit to the determined lighting state. According to the configuration, the worker or the like can be informed of a plurality of kinds of external environments by the illumination unit.

Further, in the above described configuration, the control unit changes an emission light color of the illumination unit in accordance with the detected external environment. According to the configuration, by adopting the light emission color that is easily noticed by the worker, the worker easily notices information.

Further, in the above described configuration, the control unit changes a flashing pattern of the illumination unit in accordance with the detected external environment. According to the configuration, the worker or the like notices more easily as compared with the case of only lighting.

Further, in the above described configuration, the detection unit detects at least an inclined ground, presence of a level difference, and a situation where a working load is high, as the external environments, and the flashing pattern corresponding to the inclined ground has a shorter period of flashing than the flashing patterns corresponding to the presence of a level difference, and the situation where the working load is high respectively. According to the configuration, the worker is easily notified of an inclined ground with top priority.

Further, in the above described configuration, the flashing pattern corresponding to the presence of a level difference has a shorter period of flashing than the flashing pattern corresponding to the situation where the working load is high. According to the configuration, the presence of a level difference is easily noticed by the worker with priority.

Further, in the above described configuration, the detection unit detects ambient brightness, and information on a portion in the working machine that influences the external environment. According to the configuration, with respect to the external environments other than the ambient brightness, a sensor that directly detects the external environments can be made unnecessary.

Further, in the above described configuration, the detection unit detects at least any one of an inclination amount of the working machine, a travel load exerted on the working machine and a working load exerted on the working machine, as the information on the portion in the working machine that influences the external environment. According to the configuration, at least any one of whether or not the external environment causes inclination of the machine body, whether or not the external environment causes an overload on the travel system, and whether or not the external environment causes an overload on the working system is detectable.

Further, in the above described configuration, the detection unit has a foreign object detection sensor that detects a foreign object present around the machine body, and the control unit controls the illumination unit to a lighting state that reports the presence of a foreign object when the foreign object is detected. According to the configuration, in the case of the foreign object being a living thing, the living thing is urged to pay attention, and can be caused to notice the presence of the working machine. Further, the worker is urged to pay attention by the light of the illumination unit, and easily notices the presence of the foreign object.

According to the aspect of the present invention, the presence of the working machine is noticed by those in the surroundings, and a worker is easily informed of the warning relating to the external environment.

DETAILED DESCRIPTION OF THE PREFERRED EMBODIMENTS

Hereinafter, embodiments of the present invention will be described with reference to the drawings.

First Embodiment

Figure 1:
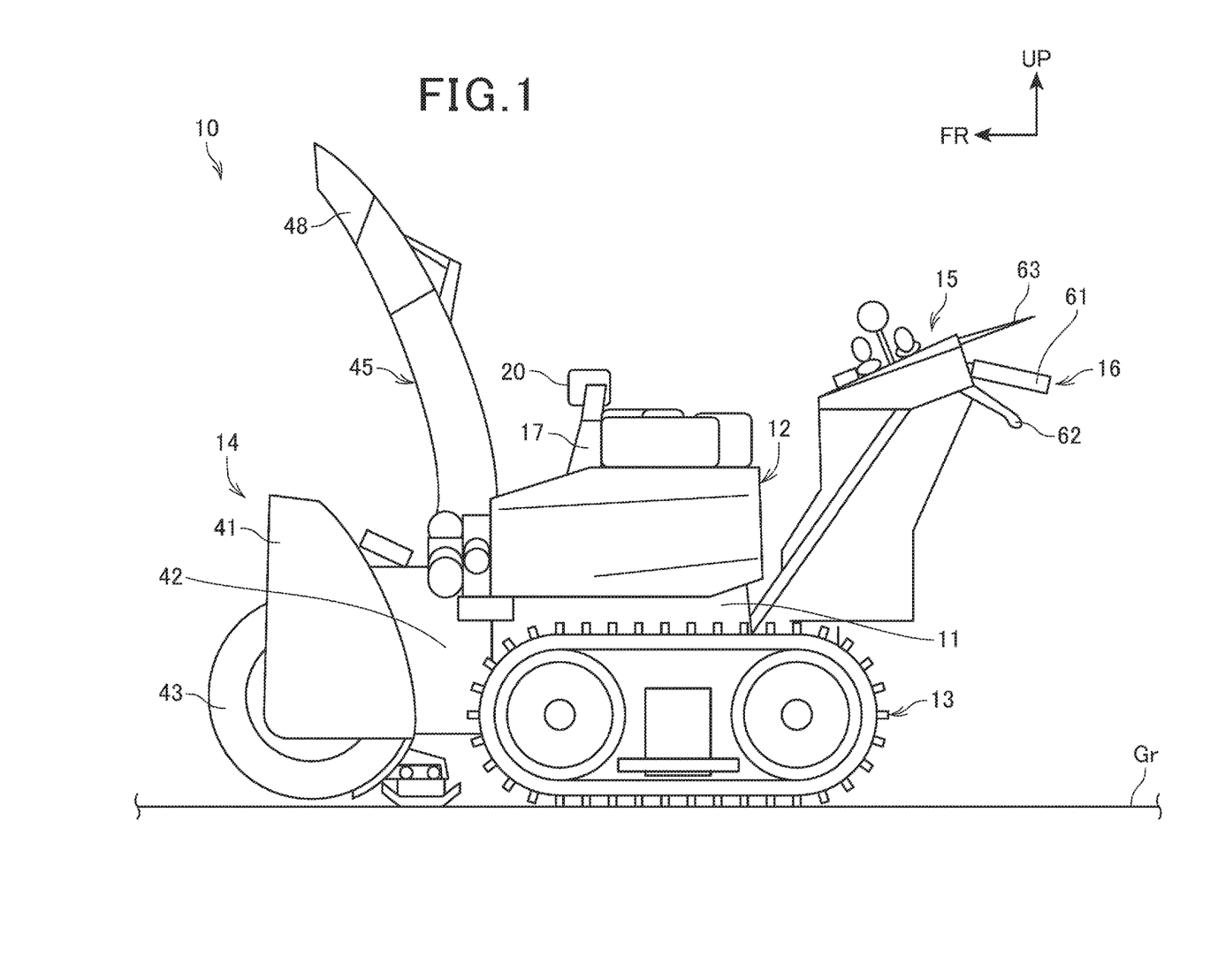
FIG. 1 is a side view of a working machine according to a first embodiment of the present invention.
Figure 2:
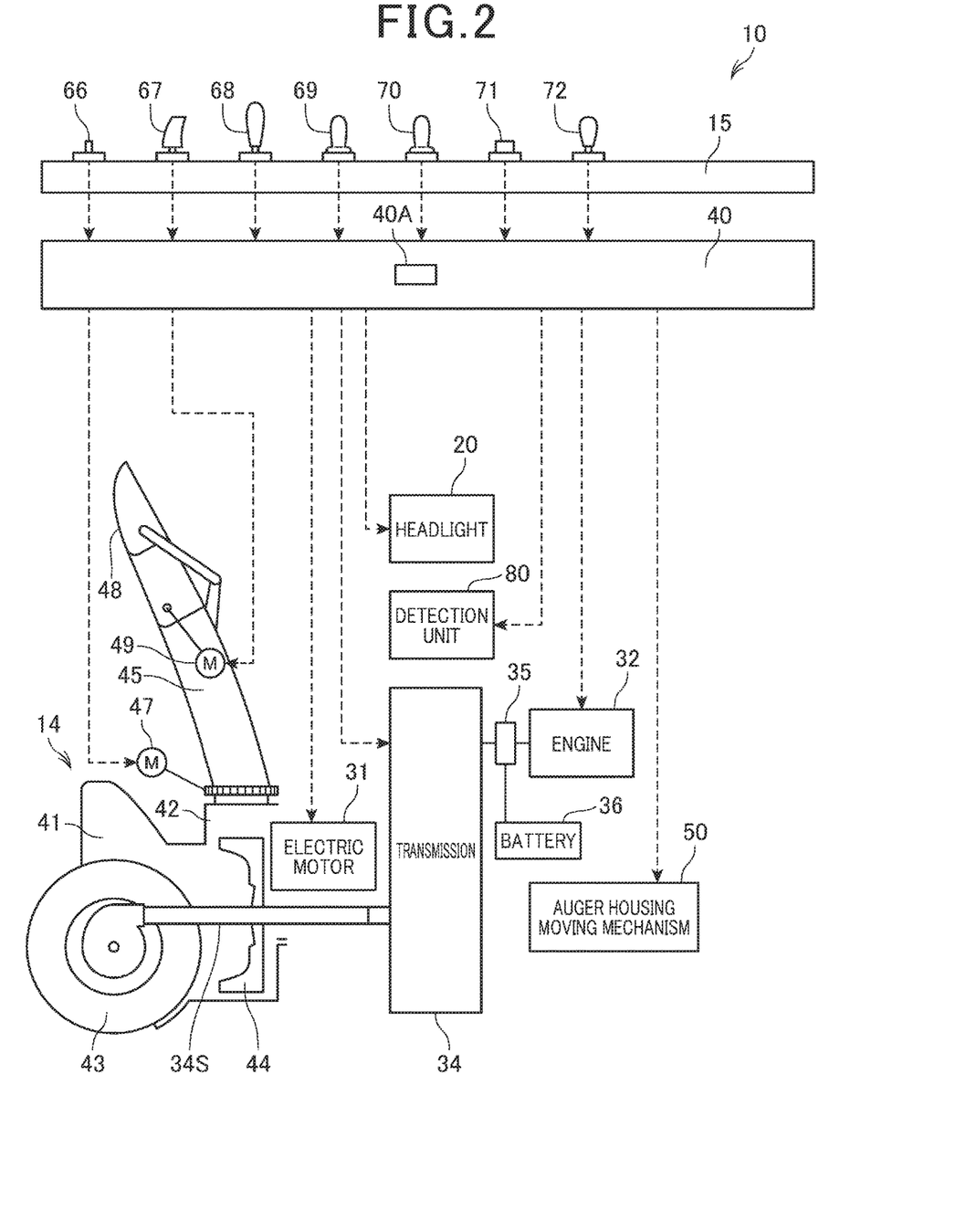
FIG. 2 is a diagram schematically illustrating a configuration of the working machine.

FIG. 1 is a side view of a working machine 10 according to a first embodiment of the present invention. Further, FIG. 2 is a diagram schematically illustrating a configuration of the working machine 10. Note that description of respective directions such as forward and rearward, left and right, and up and down indicate the respective directions with the working machine 10 as a reference. In FIG. 1 a forward direction is denoted by reference sign FR, and an upper direction is denoted by reference sign UP.

As illustrated in FIG. 1, the working machine 10 is a self-propelled type snowplow (also referred to as a walking type snowplow), which includes a power source 12, a travel device 13 (a travel unit), a snow removal working unit 14 (a working unit) and an operation panel 15 (also referred to as an operation device), in a machine body 11 (corresponding to a vehicle body frame). From a rear portion of the machine body 11 to a rear upper part, an operation handle 16 extends. A worker (also referred to as a manipulator, and an operator) who performs snow removal work grasps the operation handle 16 behind the working machine 10, and manipulates the working machine 10 while walking with the working machine 10. That is, the working machine 10 is a manned working machine.

The power source 12 is provided in a longitudinal center of the working machine 10, and a pair of arms 17 is vertically provided from a front upper portion of the power source 12 with a space left laterally. At upper ends of these arms 17, headlights 20 (illumination units) that emit illuminating light are supported. The headlights 20 are disposed rearward of the snow removal working unit 14 (an auger housing 41, a chute 45 and the like described later) disposed at a front portion of the machine body 11, and upward of the auger housing 41, and are disposed at vehicle width central positions which are displaced in the lateral direction with respect to the chute 45.

Thereby, illuminating light can be emitted forward of the working machine 10 (forward of the auger housing 41) while avoiding the chute 45.

The power source 12 drives the travel device 13 and the snow removal working unit 14, and has an electric motor 31 illustrated in FIG. 2, and an engine 32 illustrated in FIG. 2. The electric motor 31 drives the travel device 13 under control of a control unit 40 illustrated in FIG. 2. In the present configuration, crawler type travel devices 13 are included with a space left laterally, and the different electric motors 31 drive the respective travel devices 13 via speed reduction mechanisms respectively.

The engine 32 is an internal combustion engine, and drives the snow removal working unit 14 via a transmission 34 under control of the control unit 40. A generator 35 is provided at a drive shaft of the engine 32. Electric power generated by the generator 35 is supplied to electric components of the working machine 10, such as a battery 36, the electric motors 31 and the headlights 20. The travel device 13 may be configured to be driven by the engine 32.

As illustrated in FIGS. 1 and 2, the snow removal working unit 14 includes the auger housing 41, a blower housing 42 that is connected to a rear portion of the auger housing 41, an auger 43 that is provided in the auger housing 41, a blower 44 provided in the blower housing 42, and the chute 45 that extends upward from the blower housing 42.

The auger housing 41 is a cover that covers an upper part, a rear part and both left and right sides of the auger 43, and covers the auger 43 in a state where a front part and a lower part of the auger 43 are exposed.

The auger 43 is rotationally driven by rotation of an output shaft 34S of the transmission 34, and scrapes off snow in front of the working machine 10. The blower 44 supplies snow that is scraped off by the auger 43 to the chute 45 under control of the control unit 40, and blows the snow to a distant position by the chute 45. That is, the chute 45 functions as a snow throwing section that throws snow that is raked up by the auger 43 to a position away from the working machine 10.

The chute 45 is provided rotatably around an axis extending in a vertical direction, with respect to an installation surface Gr (corresponding to a travel surface on which the working machine 10 travels) on which the travel devices 13 are grounded, and is rotationally driven by a chute drive motor 47. A snow throwing direction is adjustable to an arbitrary direction of forward, rearward, left and right by the chute 45 rotating.

A chute guide 48 is provided at an upper end portion of the chute 45. The chute guide 48 is mounted swingably up and down, and an angle in the vertical direction (that is, a snow throwing angle) is adjustable. The chute guide 48 has the snow throwing angle controlled by a guide drive motor 49.

As illustrated in FIG. 1, the working machine 10 rakes up snow by the auger 43 in the front part, and can discharge the snow which is raked up to a distant place via the chute 45 by the blower 44, while traveling forward by the left and right travel devices 13.

Further, the working machine 10 includes an auger housing drive mechanism 50 that changes a posture of the auger housing 41. The auger housing drive mechanism 50 is configured by a raising and lowering drive mechanism that performs raising and lowering drive of the auger housing 41 with respect to the machine body 11, and a rolling drive mechanism that performs rolling (lateral swing) drive of the auger housing 41 with respect to the machine body 11. Thereby, a height of the auger housing 41 can be changed and an orientation to the lateral direction can be changed. In this case, the auger 43 moves with the auger housing 41.

The control unit 40 has a CPU (Central Processing Unit) (not illustrated) and a memory 40A (FIG. 2) that stores programs and various data, and controls respective units of the working machine 10 by executing, by the CPU, the programs stored in the memory 40A. The control unit 40 is disposed in a vicinity of the operation panel 15.

As illustrated in FIG. 1, the operation handles 16 each has a grip 61 that is grasped by the worker, and left and right turning operation levers 62. Further, a left operation handle 16 has a travel preparation lever 63.

The control unit 40 allows drive of the travel devices 13 and the snow removal working unit 14 when the worker performs a predetermined operation (an operation of gripping the travel preparation lever 63 to lower the travel preparation lever 63 to a grip 61 side. Further, when the worker grips the left or right turning operation lever 62, the control unit 40 controls the travel devices 13 so as to turn the working machine 10 to a gripping side.

As illustrated in FIG. 2, the operation panel 15 includes a main switch 66, a throttle lever 67, a direction speed lever 68, an auger housing lever 69, a chute operation lever 70, an auger switch 71, a target working speed setting unit 72 and the like.

The main switch 66 is a manual operator that turns on an electric system and starts the engine 32. The throttle lever 67 is a manual operator for controlling an engine speed of the engine 32. The direction speed lever 68 is a manual operator for controlling rotation of the left and right travel devices 13.

The auger housing lever 69 is a manual operator that raises and lowers and rolls the auger housing 41 in accordance with a snow surface by the auger housing drive mechanism 50 at a time of snow removal work with the auger 43. The chute operation lever 70 is an operation member for changing orientations of the chute 45 and the chute guide 48 by the chute drive motor 47 and the guide drive motor 49.

The auger switch 71 is a manual operator that switches an electromagnetic clutch that is not illustrated and provided in a power transmission route between the auger 43 and the engine 32, enables power transmission when the auger switch 71 is on, and cuts off the power transmission when the auger switch 71 is off. That is, the control unit 40 drives the auger 43 and the blower 44 by the power of the engine 32, when the operation of lowering the travel preparation lever 63 to the grip 61 side, and the operation of turning on the auger switch 71 are performed.

The target working speed setting unit 72 is a manual operator that sets a target working rotation speed of the snow removal working unit 14. A snow throwing distance from the chute 45 is determined by the rotational speed of the blower 44, so that when the target working rotational speed of the snow removal working unit 14 is set, the snow throwing distance from the chute 45 is set. That is, the target working speed setting unit 72 is also a manual operator (a snow throwing distance lever) that sets the snow throwing distance.

Further, the working machine 10 includes a detection unit 80 (FIG. 2) that detects information necessary for the control unit 40 to control the respective units of the working machine 10.

Figure 3:
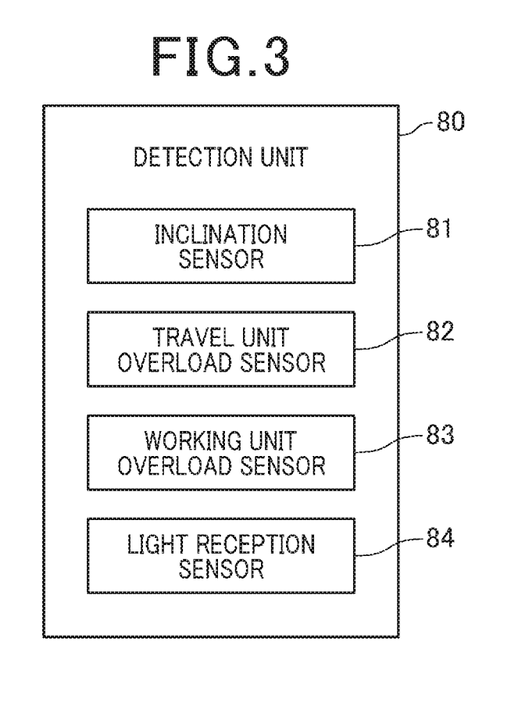
FIG. 3 is a diagram illustrating a sensor included by a detection unit.

A sensor group included by the detection unit 80 of the present configuration includes sensors that directly or indirectly detect an external environment where the machine body 11 is placed, and specifically includes an inclination sensor 81, a travel unit overload sensor 82, a working unit overload sensor 83 and a light reception sensor 84, as illustrated in FIG. 3.

The inclination sensor 81 is a sensor that detects an inclination angle (corresponding to an inclination amount) of the working machine 10, in other words, a sensor that detects an inclination angle of the installation surface Gr where the working machine 10 is installed. Thereby, the inclination sensor 81 can detect whether or not the external environment causes inclination of the working machine 10.

The travel unit overload sensor 82 is a sensor that detects an overload of the electric motor 31 based on an excess current of the electric motor 31 that drives the travel device 13. Thereby, the travel unit overload sensor 82 can detect whether or not the external environment is an environment that causes an overload (corresponding to an overload on a travel system) of the travel device 13, for example, whether or not a level difference or the like that exceeds an allowable range is present.

The working unit overload sensor 83 is a sensor that detects an overload on the engine 32 based on the engine speed or the like of the engine 32 which drives the snow removal working unit 14. For example, when the engine speed of the engine 32 becomes lower by a predetermined engine speed or more than a target engine speed (an engine speed corresponding to a target working speed), it is determined that the engine 32 is in an overload state. Thereby, the working unit overload sensor 83 can detect whether or not the external environment is an environment that causes the overload on the snow removal working unit (corresponding to the overload on the working system).

As components that detect the overload on the travel system, and the overload on the working system, known components are widely applicable. Further, instead of the travel unit overload sensor 82 and the working unit overload sensor 83, a so-called obstacle sensor that detects landforms themselves where the overload on the travel system and the overload on the working system are generated by a camera, laser or the like may be used. By using the obstacle sensor, the external environments similar to those by the above described overload sensors 82 and 83 are also detectable.

The light reception sensor 84 is a sensor that detects brightness around the machine body 11. Thereby, the light reception sensor 84 detects brightness of the external environment where the machine body 11 is placed.

The headlight 20 is configured by a case configuring an outer sheath of the headlight 20, and an LED module configuring a light source that is housed in the case. Light from the LED module is emitted forward of the machine body 11 via a transparent cover that is provided on a case front surface, and illuminates an area ahead of the working machine 10 with a light of a large light amount suitable for work.

By using an LED, energy saving and life prolongation are more easily achieved as compared with a case of using a halogen lamp. Further, reduction in size of the headlight 20, enhancement in the degree of freedom of a shape of the headlight 20, enhancement in degrees of freedom of a color of illuminating light and light distribution and the like are also easily achieved. Note that the light source is not limited to LED, but light emitting elements other than LED, or a known light source such as a halogen lamp are widely applicable.

Turning on and off of the headlight 20 are controlled by the control unit 40.

Figure 4:
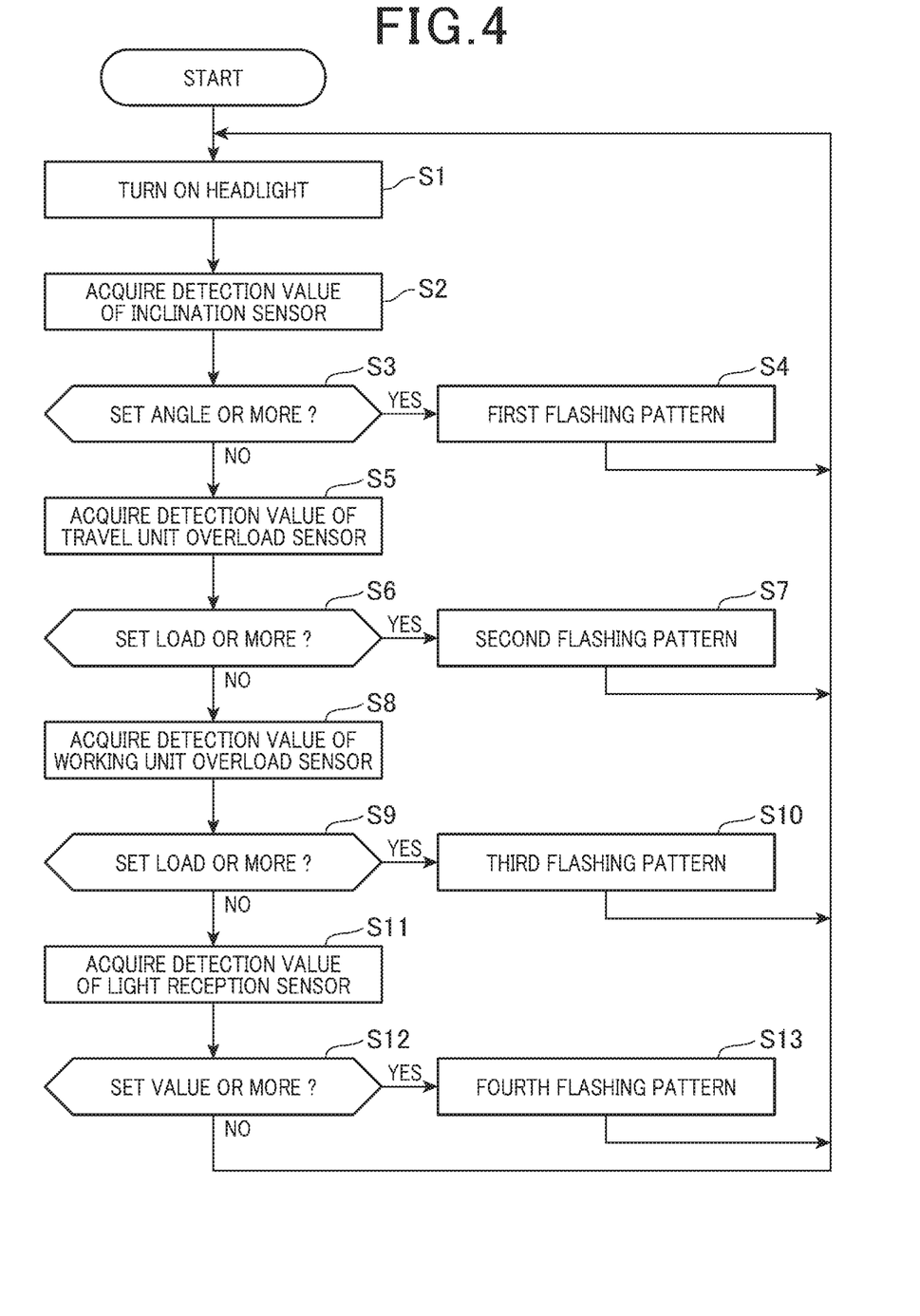
FIG. 4 is a flowchart illustrating control of a headlight by a control unit.

FIG. 4 is a flowchart illustrating control of the headlight 20 by the control unit 40. The control is started when the main switch 66 of the operation panel 15 is turned on, and is executed until the main switch 66 is turned off. In the present configuration, by the control, the headlight 20 is also used as an information providing unit that provides various kinds of information to the worker.

First, the control unit 40 turns on the headlight 20 (step S1), thereafter acquires a detection value of the inclination sensor 81 (step S2), and determines whether or not an inclination angle determined from the detection value is a predetermined set angle or more (step S3). The set angle is a lower limit value of an inclination angle at which it is preferable to urge the worker to pay attention, and is set at an appropriate value.

When the inclination angle is the set angle or more (step S3; YES), the control unit 40 controls lightning of the headlight 20 with a flashing pattern set in advance (hereinafter, described as a first flashing pattern P1) (step S4).

FIG. 5A to FIG. 5E illustrate examples of a plurality of kinds of flashing patterns. A first flashing pattern P1 is a lighting state (properly including lighting out without being limited to lighting), and is a flashing pattern which is associated with an "inclination warning" in one to one correspondence. In the present configuration, the first flashing pattern P1 is set at a flashing pattern that repeats lighting and lighting out at shortest periods.

When the inclination angle is less than the set angle (step S3; NO), the control unit 40 acquires a detection value of the travel unit overload sensor 82 (step S5), and determines whether or not an overload of the travel system which is determined from the detection value is a predetermined set load or more (step S6). The set load is a lower limit value of the travel system load at which it is preferable to urge the worker to pay attention, and is set at an appropriate value.

When the overload of the travel system is the set load or more (step S6; YES), the control unit 40 controls lighting of the headlight 20 with a predetermined flashing pattern (hereinafter described as a second flashing pattern P2) (step S7).

Figure 5A:
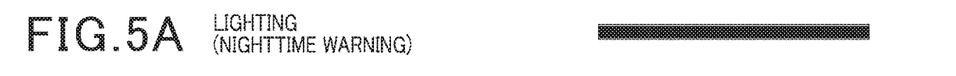
FIGS. 5A to 5E are diagrams illustrating examples of a plurality of kinds of flashing patterns.
Figure 5B:
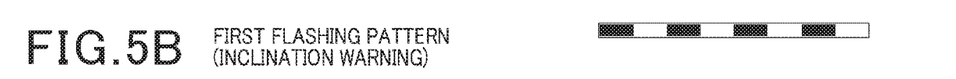
Figure 5C:
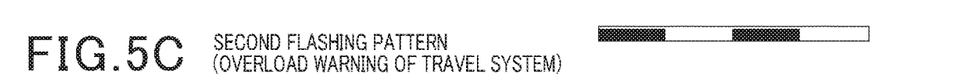

The second flashing pattern P2 is a lighting state that individually informs that a load on the travel system is high (corresponding to the presence of a level difference) due to a factor other than an inclination, and is a flashing pattern that is associated with "an overload warning of the travel system" in one to one correspondence. In the present configuration, as illustrated in FIG. 5B and FIG. 5C, the second flashing pattern P2 is set at a flashing pattern that flashes at periods each twice as long as the period of the first flashing pattern P1.

When the overload on the travel system is less than a set load (step S6; NO), the control unit 40 acquires a detection value of the working unit overload sensor 83 (step S8), and determines whether or not the overload on the working system, which is determined from the detection value, is a predetermined set load or more (step S9). The set load is a lower limit value of the working system load at which it is preferable to urge the worker to pay attention, and is set at an appropriate value.

In the case of the set load or more (step S9; YES), the control unit 40 controls flashing of the headlight 20 with a predetermined flashing pattern (hereinafter, described as a third flashing pattern P3) (step S10).

Figure 5D:
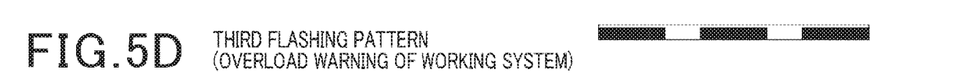
Figure 5E:
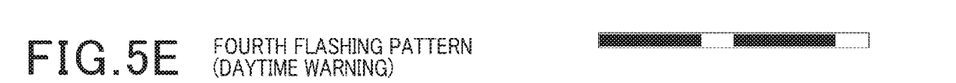

The third flashing pattern P3 is a flashing state that individually informs that the load on the working system is high (appropriately including lighting out without being limited to lighting), and is a flashing pattern associated with "the overload warning of the working system" in one to one correspondence. In the present configuration, as illustrated in FIG. 5D, the third flashing pattern P3 is set at a flashing pattern in which the lighting-out time period is made shorter as compared with a lighting time period.

When the overload on the working system is less than the set load (step S9; NO), the control unit 40 acquires a detection value of the light reception sensor 84 (step S11), and determines whether or not ambient brightness, which is determined from the detection value is a predetermined set value or more (step S12). The set value is set at a threshold value for determining whether it is daytime or nighttime, and is set at an appropriate value.

When the ambient brightness is the predetermined set value or more (step S11; YES), that is, in the case of daytime, the control unit 40 controls lighting of the headlight 20 with the predetermined flashing pattern (hereinafter, described as a fourth flashing pattern P4) (step S13).

The fourth flashing pattern P4 is a lighting state (also properly including lighting out without being limited to lighting) that individually informs that it is daytime, and is a flashing pattern that is associated with "a daytime warning" in one to one correspondence. In the present configuration, as illustrated in FIG. 5B to FIG. 5E, the fourth flashing pattern P4 is set at a flashing pattern in which a longest flashing time period and a shortest flashing time period in the first flashing pattern P1 to the fourth flashing pattern P4 are repeated.

When the ambient brightness is less than a set value (step S11; NO), the control unit 40 shifts to processing in step S1. Thereby, in the case of nighttime, the control unit 40 keeps the headlight 20 in a lighting state which is associated with "the nighttime warning". In other words, the state where the headlight 20 is kept lighting is a flashing state that individually informs that it is nighttime, and is a lighting state that is associated with "the nighttime warning" in one to one correspondence.

FIG. 6A to FIG. 6E illustrate a plurality of kinds of external environments in which the working machine 10 during operation is placed.

Figure 6A:
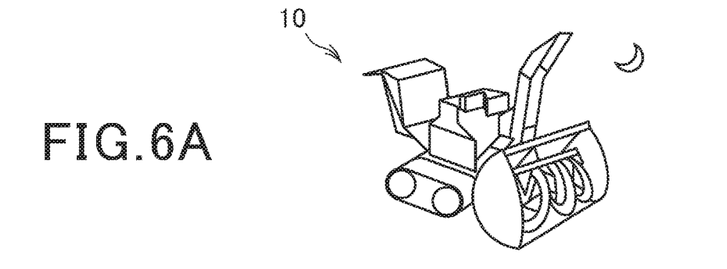
FIGS. 6A to 6E are views respectively illustrating external environments where the working machine during operation is placed.

By control of the headlight 20 described above, in the case of nighttime illustrated in FIG. 6A, the headlight 20 is kept in the lighting state. In this case, change in appearance is larger as compared with a case where the lighting state is kept in daytime, and the presence of the working machine 10 can be sufficiently noticed by those in the surroundings. Further, the area ahead can be continuously illuminated.

Figure 6B:
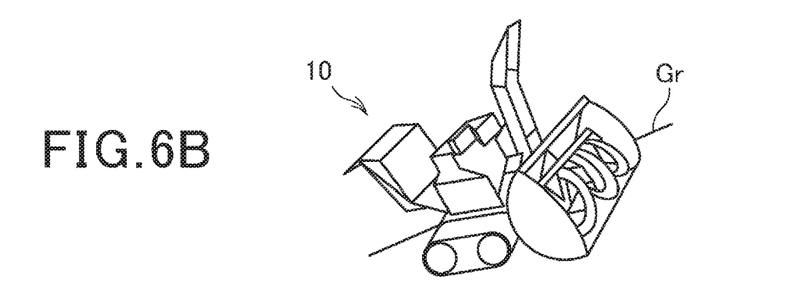

In a case of an inclined ground illustrated in FIG. 6B, if an inclination angle is a set angle or more, the headlight 20 is controlled to flash with the first flashing pattern P1 corresponding to "the inclination warning". Thereby, the worker can notice "the inclination warning" while seeing the area ahead.

Figure 6C:
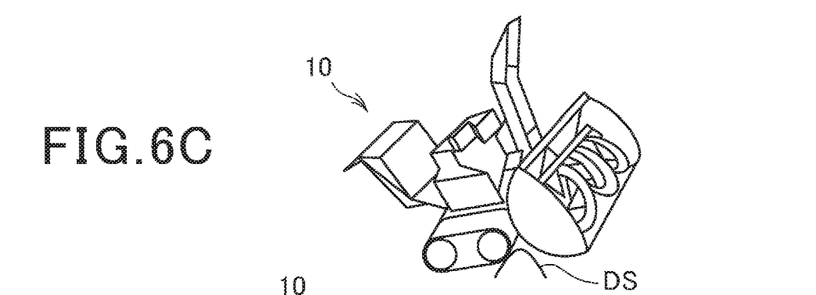

When a level difference DS illustrated in FIG. 6C is present, if the overload on the travel system (the electric motor 31) is the set load or more, the headlight 20 is controlled to flash with the second flashing pattern P2 corresponding to "the overload warning of the travel system". Thereby, the worker can notice "the overload warning of the travel system" while seeing the area ahead.

Figure 6D:
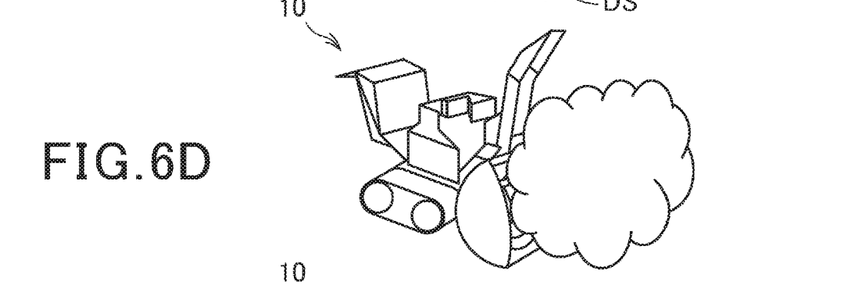

In a case of the situation that causes an overload on the snow removal working unit 14 illustrated in FIG. 6D (for example, in a case where a large amount of stone is included and the like), the headlight 20 is controlled to flash with the third flashing pattern P3 corresponding to "the overload warning of the working system". Thereby, the worker can notice "the overload warning of the working system" while seeing the area ahead.

Figure 6E:
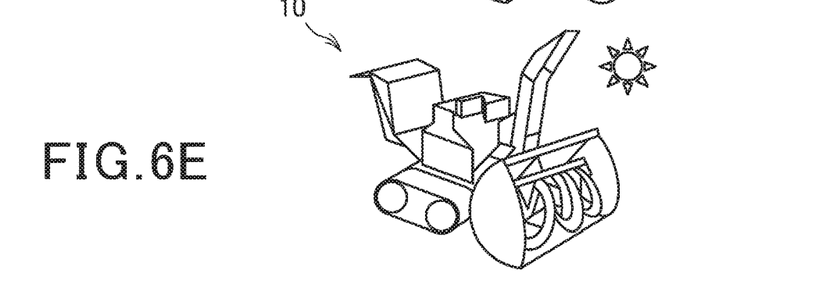

In a case of daytime illustrated in FIG. 6E, the headlight 20 is controlled to flash with the fourth flashing pattern P4 corresponding to "the daytime warning". Thereby, change in appearance in the daytime can be increased as compared with the case of keeping the headlight 20 in the lighting state, and a person other than the worker and the like easily notice it. In addition, the fourth flashing pattern P4 is a pattern in which the lighting time period is increased relatively, and the lighting out time period is relatively shortened, so that those in the surroundings can notice it more easily, and the working region can be efficiently illuminated.

When the inclination angle is less than the set angle, the overload on the travel system (the electric motor 31) is less than the set load, and the overload on the snow removal working unit 14 is less than the set load, the headlight 20 is kept in the lighting state corresponding to "the nighttime warning" when it is nighttime, and the headlight 20 is controlled to flash with the fourth flashing pattern P4 corresponding to "the daytime warning" when it is daytime. Thereby, the presence of the working machine 10 can be sufficiently noticed by those in the surroundings.

As described above, the working machine 10 of the present embodiment includes the detection unit 80 including sensors 81 to 84 that detect the external environment of the machine body 11, and the control unit 40 that controls the headlight 20 that functions as the illumination unit based on the detected external environment. Thereby, by using the headlight 20 that emits illuminating light outward, the presence of the working machine 10 is noticed by those in the surroundings in accordance with the external environment, and a worker or the like is easily informed of a warning relating to the external environment.

In this case, the headlight 20 is controlled, so that even in the environment where the working machine 10 cannot be recognized by sound emitted from the working machine 10, for example, in a noisy environment, or when the working machine 10 is traveling quietly, the presence of the working machine 10 is easily noticed by those in the surroundings.

Further, by the sensors 81 to 84, a plurality of kinds of external environments such as an inclined ground, presence of a level difference, a situation where the working load is high, and daytime are detected, and the control unit 40 determines the lighting state which is associated with the detected external environment from the lighting states individually reporting the plurality of kinds of external environments (corresponding to the first flashing pattern P1 to the fourth flashing pattern P4 and the like), and controls the headlight 20 to the determined lighting state. Thereby, the worker or the like can be informed of the plurality of kinds of external environments by the headlight 20.

Further, the control unit 40 can change the flashing pattern of the headlight 20 in accordance with the detected external environment, so that the worker or the like can more easily notice as compared with the case of only lighting.

In the present configuration, in the first flashing pattern P1 corresponding to the inclined ground, the period of flashing is made shorter than those in the second flashing pattern P2 to the fourth flashing pattern P4 respectively corresponding to the presence of a level difference, a situation where the working load is high, and daytime. This makes it possible for a worker to be aware of being on an inclined ground that most requires attention in these external environments, with a top priority.

Further, in the second flashing pattern P2 corresponding to the presence of a level difference, the period of flashing is made shorter than those in the third flashing pattern P3 and the fourth flashing pattern P4 corresponding to the situation with a high working load and daytime respectively. This makes it possible for a worker to be aware of being in the external environment that influences the travel system, which relatively requires attention in these external environments with a priority.

The lighting states that individually report the plurality of kinds of external environments do not have to be limited to the flashing patterns, but may be change of an emitting light color or the like. For example, when it is detected as being on the inclined ground, the lighting pattern (may include flashing) including a color that is easily noticed by the worker with a top priority is adopted, and in the case of the presence of a level difference, the situation where the working load is high, and daytime, the lighting patterns including colors that are more easily noticed by the worker with a priority in this order are preferably adopted.

Further, the control unit 40 detects the external environment by detecting an inclination amount of the working machine 10, the travel load on the working machine 10, and a working load exerted on the working machine 10 by the sensors 81 to 83. That is, the control unit 40 detects information of parts that influence the external environments (the inclined ground, presence of a level difference, the situation where the working load is high) in the working machine 10, and thereby indirectly detects the external environments. Thereby, with respect to the external environments other than the ambient brightness, the sensors that directly detect the external environments can be made unnecessary. In this case, it is possible to also use the existing sensor of the working machine as the sensor that detects the external environments.

In addition, the control unit 40 reports a warning by the headlight 20, so that an illumination device or the like exclusive for warning is not required, and the worker can notice the warning while seeing the area ahead. This also makes it easy to inform the worker of the warning relating to the external environment.

Second Embodiment

Figure 7:
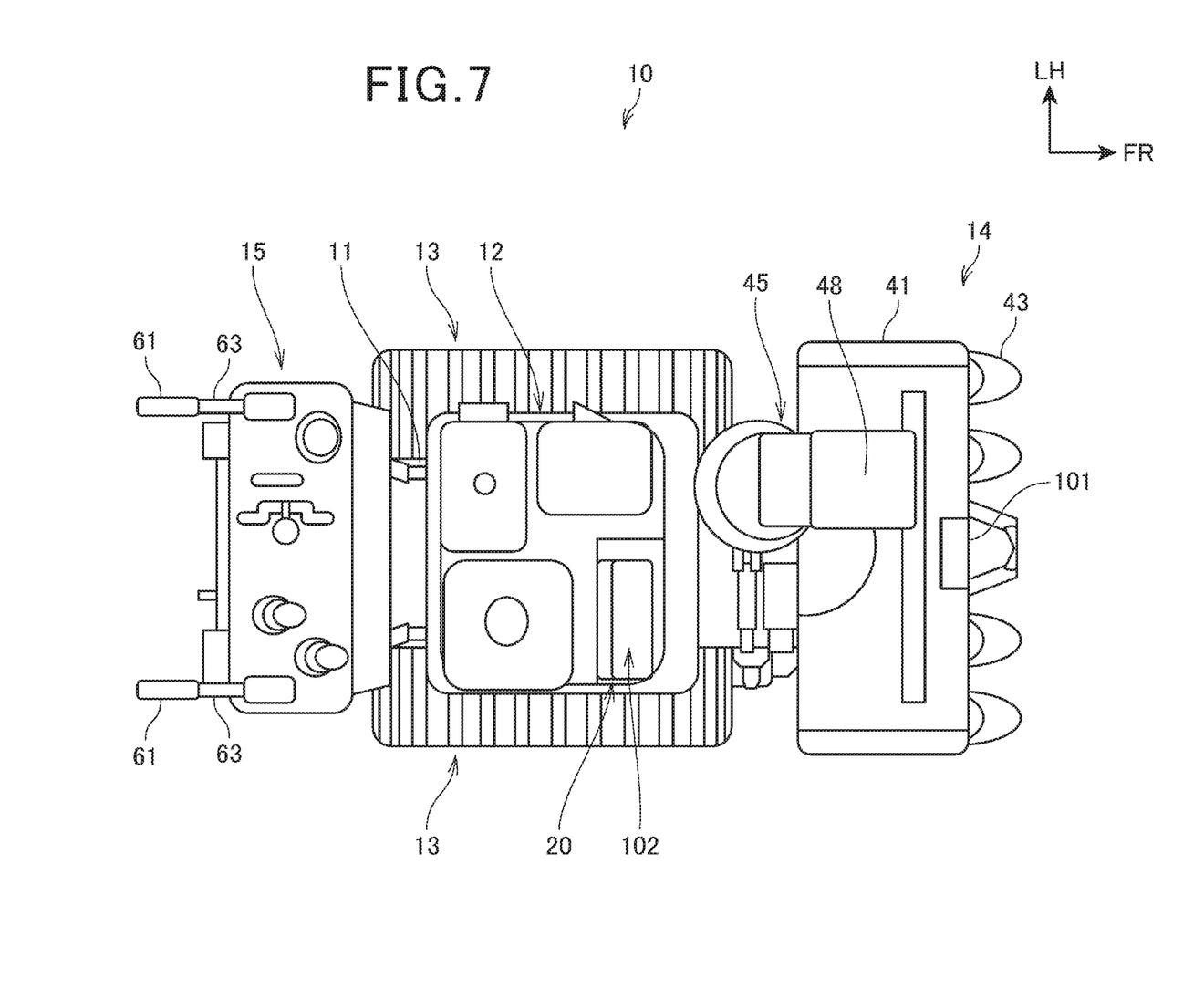
FIG. 7 is a view of a working machine according to a second embodiment as seen from above.

FIG. 7 is a view of the working machine 10 relating to a second embodiment seen from above. Note that components similar to those in the first embodiment will be assigned with the same reference signs, and different parts will be described. In the drawing, a forward direction is denoted by reference sign FR, an upper direction is denoted by reference sign UP, and a left direction is denoted by reference sign LH.

The working machine 10 includes a foreign object detection sensor 101 that detects a foreign object present around the machine body 11, and a light emitting device 102 (an illumination unit) that emits flash light.

The foreign object detection sensor 101 is disposed on a top surface of the auger housing 41 and in a lateral center, and detects a foreign object present in the area ahead that is a working direction of the machine body 11. The foreign object is an obstacle to snow removal work, and is a human being or an animal in the present configuration. The obstacle detection sensor 101 is, for example, an infrared ray sensor, a heat sensitive sensor, or an image recognition device using a camera, and any one of them or a plurality of them may be used. Known other sensors may be applied as the foreign object detection sensor 101.

That is, the foreign object detection sensor 101 can be also said as a detection unit that directly detects whether or not the external environment where the machine body 11 is placed is an environment where a foreign object is present. The foreign object detection sensor 101 may be configured to indirectly detect whether or not the external environment where the machine body 11 is placed is an environment where a foreign object is present.

The foreign object detection sensor 101 has an orientation, sensitivity and the like set so as to detect a foreign object present in a predetermined detection area. The detection area is set at an area that has a relatively high possibility of contacting the snow removal working unit 14, in other words, is set at an area in which the worker should be informed of the presence of a foreign object.

Figure 8:
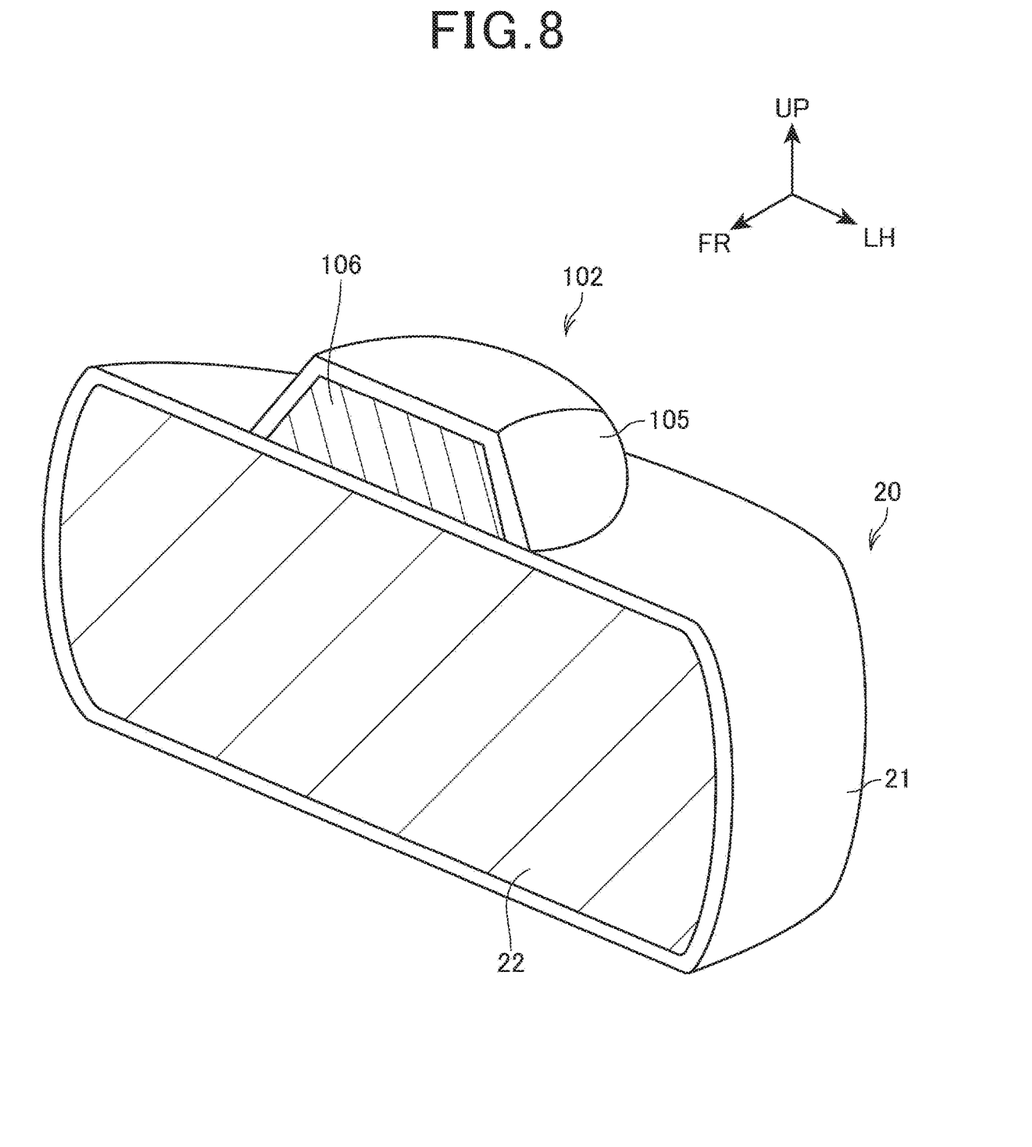
FIG. 8 is a view illustrating a light emitting device with a peripheral configuration.
Figure 9:
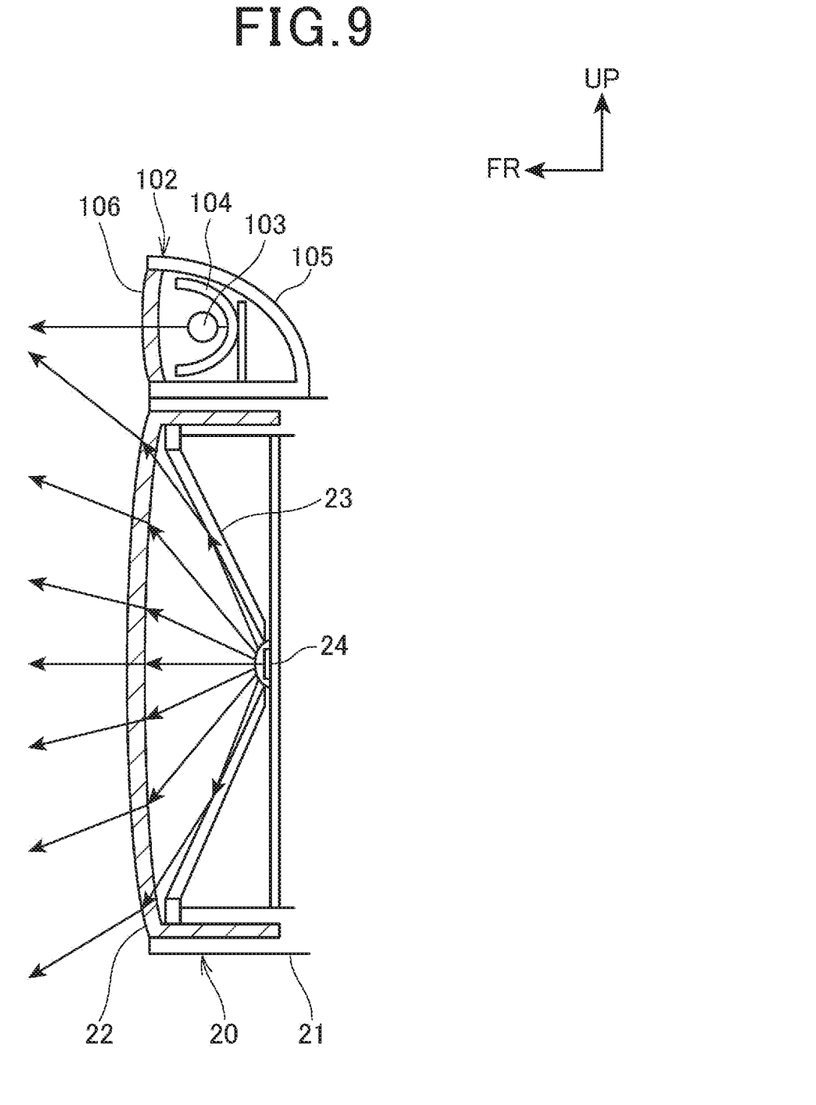
FIG. 9 is a sectional side view illustrating the light emitting device with the peripheral configuration.

FIG. 8 is a view illustrating the light emitting device 102 with a peripheral configuration, and FIG. 9 is a sectional side view illustrating the light emitting device 102 with the peripheral configuration.

The light emitting device 102 is configured integrally with the headlight 20, and is provided on an uppermost portion of the headlight 20. The light emitting device 102 is configured by a flash light source 103 that is a light source of the flash light, a reflection mirror 104 that reflects flash light from the flash light source toward the front that is the emitting direction, a case 105 that houses these components and configures an outer sheath of the light emitting device 102, and a transparent cover 106 that is provided on a front surface of the case 105.

The flash light source 103 is, for example, a xenon lamp. However, the flash light source is not limited to a xenon lamp, but other light sources such as LED capable of emitting flash light may be used.

The reflection mirror 104 emits flash light from the flash light source 103 toward the front with high efficiency. An area which the flash light reaches includes at least the detection area of the foreign object detection sensor 101. Thereby, a human being and an animal present in the detection area of the foreign object detection sensor 101, and a human being and an animal close to the detection area can be irradiated with flash light. The case 105 may be integrated with the case 21 of the headlight 20.

It is possible to apply a known device such as a so-called strobe device to the light emitting device 102. The light emitting device 102 performs lighting of the flash light by using electric power of the battery 36 under control of the control unit 40.

In the present configuration, the light emitting device 102 is provided on the uppermost portion of the headlight 20, so that as compared with the case where the light emitting device 102 is provided at a lower position than the headlight 20, flash light can reach a more distant place with higher efficiency. Further, the light emitting device 102 and the headlight 20 can easily share a part of the configuration, which is advantageous in simplification of the configuration, and a mounting place for the light emitting device 102 can be easily ensured.

As illustrated in FIG. 9, the headlight 20 has a reflector 23 between a case 21 and a transparent cover 22. The reflector 23 distributes light from an LED module 24 to a proper range including a working region.

Figure 10:
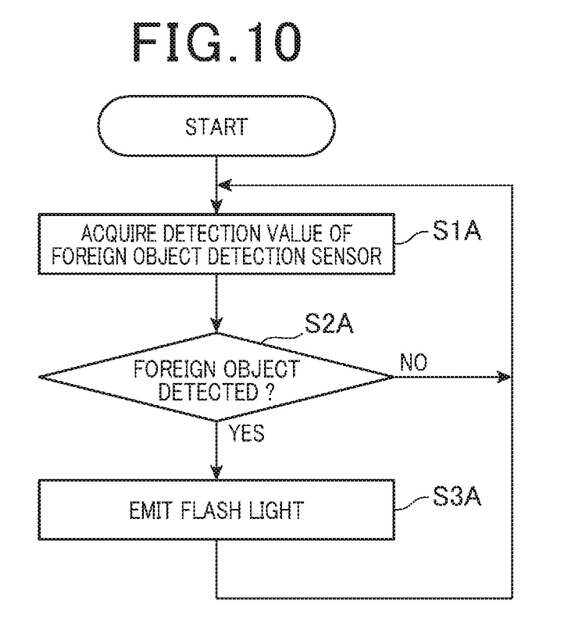
FIG. 10 is a flowchart illustrating control of the light emitting device by a control unit.

FIG. 10 is a flowchart illustrating control of the light emitting device 102 by the control unit 40. The control is started when the main switch 66 of the operation panel 15 is turned on, and is executed until the main switch 66 is turned off.

The control unit 40 acquires a detection value of the foreign object detection sensor 101 (step S1A), compares the detection value with a predetermined threshold value, and thereby determines whether or not a foreign object is detected (step S2A). When a foreign object is detected (step S2A; YES), the control unit 40 emits flash light by the light emitting device 102 (step S3A).

When a foreign object is not detected (step S2A; NO), the control unit 40 shifts to processing of step S1A. Thereby, processing in steps S1A and S2A is repeated until a foreign object is detected, and when a foreign object is detected, the flow shifts to processing of step S3A, and flash light is emitted immediately. Here, in the processing in step S3A, flash light is preferably emitted a predetermined plurality of times, or in a predetermined emission time period repeatedly.

By the above control, flash light is emitted a plurality of times, that is, flashing is performed (corresponding to a lighting state reporting the presence of a foreign object), when the foreign object enters the detection area of the foreign object detection sensor 101. Thereby, a living thing is urged to pay attention if the foreign object is a living thing such as a human being or an animal, and the presence of the working machine 10 can be noticed by the foreign object. Further, the worker is urged to pay attention by flash light, and easily notices the presence of a moving foreign object by flash light.

Further, the light emitting device 102 emits light toward the front, so that the worker can notice the presence of a foreign object (that is, a foreign object warning) while seeing the area ahead.

In this way, in the present configuration, when a foreign object is detected by the foreign object detection sensor 101, light emission of the light emitting device 102 is performed without stopping the working machine 10. Accordingly, even when the foreign object detection sensor 101 erroneously operates (that is, even when detecting a foreign object in a state where no foreign object is present), work is not forcefully stopped.

That is, in the present configuration, only light emission of the light emitting device 102 is performed as a support function of the worker, so that even when a sensor (for example, an infrared ray sensor) in which erroneous detection occurs relatively easily is used as the foreign object detection sensor 101, it is possible to continue work when it can be determined as an erroneous operation of the sensor obviously as seen from the worker.

Further, the light emitting device 102 is integrated with the headlight 20, whereby it is advantageous in simplification of the configuration, and the mounting place for the light emitting device 102 can be easily ensured. For example, it is easy to retrofit the light emitting device 102 to the existing working machine.

The case of the foreign object detection sensor 101 detecting a foreign object in the area ahead is described, but the place of the foreign object is not limited to the area ahead. Further, the case of the light emitting device 102 emitting light to the area ahead is described, but the direction is not limited to the front.

The aforementioned respective embodiments are only modes for carrying out the present invention, and modifications and applications can be made arbitrarily within the range without departing from the gist of the present invention.

For example, in the aforementioned respective embodiments, the configurations and disposition places of the headlight 20, the light emitting device 102 and the foreign object detection sensor 101 may be properly changed.

Further, in the first embodiment, the case of controlling the headlight 20 based on the detected external environment is described, but an illumination unit other than the headlight 20 may be controlled. As the illumination unit to be controlled, any illumination unit can be adopted as long as it can cause those in the surroundings or the worker to notice the presence of the working machine 10 by illuminating light. Further, the headlight 20 may have a function of emitting flash light.

Further, in the second embodiment, the case of the light emitting device 102 emitting flash light is described, but the light is not limited to the flash light.

Further, the case of the working machine 10 is of an auger type is described, but the working machine 10 may be of a dozer type, or configurations of a known snowplow may be applied to the configurations of the respective units of the working machine 10. Further, the working machine 10 is not limited to a snowplow, but may be a working machine other than a snowplow.

REFERENCE SIGNS LIST

10 Working machine
11 Machine body
12 Power source
13 Travel device (travel unit)
14 Snow removal working unit (working unit)
15 Operation panel (operation device)
16 Operation handle
20 Headlight (illumination unit)
40 Control unit
80 Detection unit
81 Inclination sensor
82 Travel unit overload sensor
83 Working unit overload sensor
84 light reception sensor
101 Foreign object detection sensor
102 Light emitting device (illumination unit)

What is claimed is:

1. A working machine including an illumination unit that emits illuminating light outward, in a machine body, comprising:
   a detection unit that detects an external environment of the machine body; and
   a control unit that has a central processing unit and that controls the illumination unit based on the external environment,
   wherein
   the detection unit includes a plurality of sensors and detects a plurality of external environments including an inclined ground,
   the control unit changes a flashing pattern of the illumination unit in accordance with the detected external environment, and
   the flashing pattern corresponding to the inclined ground has a shorter period of flashing than flashing patterns respectively corresponding to other external environments.

2. The working machine according to claim 1,
wherein the control unit changes an emission light color of the illumination unit in accordance with the detected external environment.

3. The working machine according to claim 1,
wherein the detection unit detects at least the inclined ground, presence of a level difference, and a situation where a working load is high, as the external environments.

4. The working machine according to claim 3,
wherein the flashing pattern corresponding to the presence of the level difference has a shorter period of flashing than the flashing pattern corresponding to the situation where the working load is high.

5. The working machine according to claim 1,
wherein the detection unit detects ambient brightness, and information on a portion in the working machine that influences the external environment.

6. The working machine according to claim 5,
wherein the detection unit detects at least any one of an inclination amount of the working machine, a travel load exerted on the working machine and a working load exerted on the working machine, as the information on the portion in the working machine that influences the external environment.

7. The working machine according to claim 1,
wherein the detection unit has a foreign object detection sensor that detects a foreign object present around the machine body, and
the control unit controls the illumination unit to a lighting state that reports presence of the foreign object when the foreign object is detected.

* * * * *